(12) United States Patent
Atarashi (10) Patent No.: US 10,210,440 B2
(45) Date of Patent: Feb. 19, 2019

(54) PRINT OUTPUT CONTROL DEVICE WITH BUFFER MANAGEMENT FOR COMMUNICATING TO AND FROM A PRINTER USING ONE COMMUNICATION PATH AND CONTROL METHOD THEREFOR

(71) Applicant: SEIKO INSTRUMENTS INC., Chiba-shi, Chiba (JP)

(72) Inventor: Yoshiharu Atarashi, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 25 days.

(21) Appl. No.: 15/432,048

(22) Filed: Feb. 14, 2017

(65) Prior Publication Data

US 2017/0255847 A1 Sep. 7, 2017

(30) Foreign Application Priority Data

Mar. 1, 2016 (JP) .................. 2016-039183

(51) Int. Cl.
*G06K 15/02* (2006.01)
*G06K 15/00* (2006.01)
*G06F 3/12* (2006.01)

(52) U.S. Cl.
CPC ....... *G06K 15/1822* (2013.01); *G06F 3/1203* (2013.01); *G06F 3/1277* (2013.01); *G06F 3/1284* (2013.01); *G06K 15/1817* (2013.01); *G06K 15/402* (2013.01); *G06K 2215/0017* (2013.01)

(58) Field of Classification Search
None
See application file for complete search history.

(56) References Cited

U.S. PATENT DOCUMENTS

2005/0169290 A1* 8/2005 Sumita ................... G06K 15/00
370/412
2009/0125537 A1* 5/2009 Susi, III ................ G06F 17/227

FOREIGN PATENT DOCUMENTS

JP 2002127508 5/2002

OTHER PUBLICATIONS

European Search Report dated Jul. 20, 2017 in Application No. EP 17 15 8703.

* cited by examiner

*Primary Examiner* — Andrew H Lam
(74) *Attorney, Agent, or Firm* — Adams & Wilks

(57) ABSTRACT

A print output control device operably connected to a printer, is configured to periodically check a first buffer sequentially storing print data received from the printer; accumulate, when the print data is stored in the first buffer, the stored print data in a second buffer; store, when status information on the printer is included in the print data, the status information in a status storage unit; store, when a first function is executed, in a third buffer, the print data accumulated in the second buffer to send back the stored print data as an acquisition value for the first function; and store, when a second function is executed, in a third buffer, the print data accumulated in the second buffer from when the second function is executed to send back the stored print data as an acquisition value for the second function.

10 Claims, 8 Drawing Sheets

PRINT OUTPUT CONTROL DEVICE WITH BUFFER MANAGEMENT FOR COMMUNICATING TO AND FROM A PRINTER USING ONE COMMUNICATION PATH AND CONTROL METHOD THEREFOR

BACKGROUND OF THE INVENTION

1. Field of the Invention

The present invention relates to a print output control device and a control method therefor.

2. Description of the Related Art

In general, a printer is capable of bi-directional communication to and from a host device, and is configured to perform printing by receiving commands and print data from the host device via an interface (I/F). For example, the printer includes a buffer for receiving those pieces of data, and is configured to execute print processing while pooling a certain amount of information in the buffer.

In communication between that type of printer and the host device, there are required, for example, a reception data acquisition function for acquiring reception data by the host device from the printer, an information acquisition function for acquiring specific information from the printer by issuing an acquisition request (transmitting a command) by the host device to the printer, and a monitoring function of a status of the printer. For example, in order to implement those three functions, in the case of communication using a transmission control protocol (TCP) or the like, there may be employed a method involving providing a plurality of communication paths (ports) and using corresponding one of those plurality of communication paths for each function.

However, for a communication application programming interface (API) of a software development kit (SDK) provided in an operating system (OS) designed for use in a mobile terminal, for example, a Bluetooth (trademark) communication function that is used in a mobile terminal, there may only be one communication path to be provided. As a result, in this technical field, there has been a need to enable a plurality of functions to be implemented by one communication path (port) to and from an output device like a printer (printing device).

SUMMARY OF THE INVENTION

According to one embodiment of the present invention, there is provided a print output control device operably connected to an output device, including a communication circuit configured to communicate to and from the printer by using one communication path; a first buffer configured to sequentially store print data received from the printer; a second buffer configured to accumulate the print data stored in the first buffer; a status storage unit configured to store status information on the printer included in the print data; a data storage controller configured to: periodically check the presence of of the the print data in the first buffer; accumulate the stored print data in the second buffer when the print data is stored in the first buffer; and store the status information in the status storage unit when the status information is included in the print data; a first function controller configured to store, when a first function for acquiring the print data received from the printer is executed, in the third buffer, the print data accumulated in the second buffer to send back the stored print data as an acquisition value for the first function; and a second function controller configured to store, when a second function for acquiring specific information from the printer is executed, in the third buffer, the print data accumulated in the second buffer from when the second function is executed to send back the stored print data as an acquisition value for the second function.

In the above-mentioned print output control device according to the one embodiment of the present invention, the data storage controller comprises a data analyzer configured to analyze whether or not the status information is included in the print data to be accumulated in the second buffer from the first buffer, and the data storage controller is configured to store the status information in the status storage unit when it is determined based on an analysis result by the data analyzer that the status information is included in the print data.

In the above-mentioned print output control device according to the one embodiment of the present invention, the second function controller is configured to store, up to a designated maximum number of pieces of data, in the third buffer, the print data accumulated in the second buffer from when the second function is executed to send back the stored print data as the acquisition value for the second function.

In the above-mentioned print output control device according to the one embodiment of the present invention, the first function comprises a function for acquiring the print data from one of a start of communication to and from the printer and previous acquisition of the print data until the first function is executed.

In the above-mentioned print output control device according to the one embodiment of the present invention, the second function comprises a function for acquiring information set in the printer.

In the above-mentioned print output control device according to the one embodiment of the present invention, the second buffer comprises a ring buffer.

According to one embodiment of the present invention, there is provided a control method for a print output control device operably connected to a printer, the print output control device having a communication circuit configured to communicate to and from an output device by using one communication path, the control method including periodically checking a first buffer configured to sequentially store print data received from the printer via the communication circuit, and accumulating, when the print data is stored in the first buffer, the stored print data in a second buffer; storing, when status information is included in the print data, the status information in a status storage unit; storing, when a first function for acquiring the print data received from the printer is executed, in a third buffer, the print data accumulated in the second buffer, and sending back the stored print data as an acquisition value for the first function; and storing, when a second function for acquiring specific information from the printer is executed, in the third buffer, the print data accumulated in the second buffer from when the second function is executed, and sending back the stored print data as an acquisition value for the second function.

DESCRIPTION OF THE EMBODIMENTS

Figure 1:
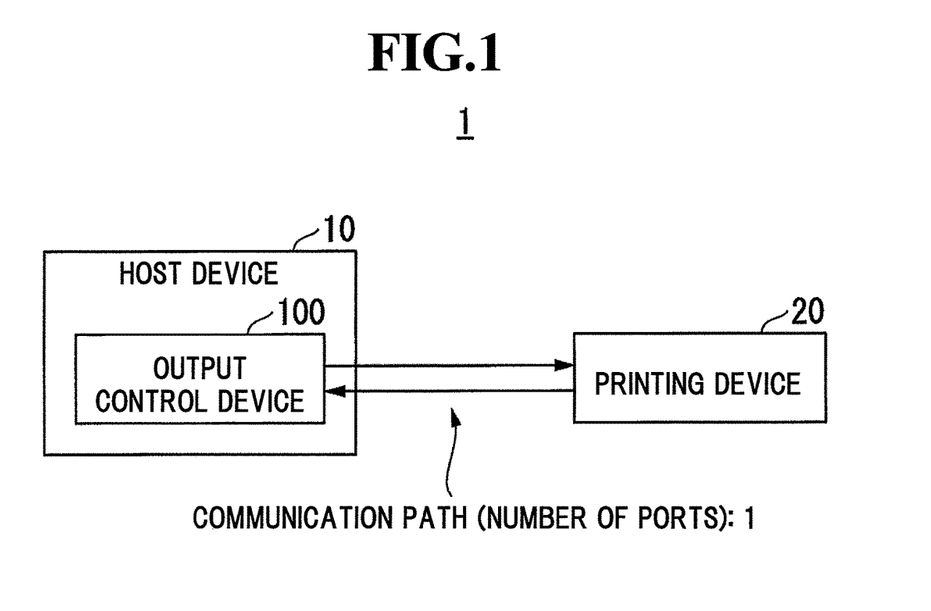
FIG. 1 is a diagram for illustrating a configuration example of a printing system according to one embodiment of the present invention.

One embodiment of the present invention is described below with reference to the drawings. FIG. 1 is a diagram for illustrating a configuration example of a printing system 1 according to this embodiment. The printing system 1 includes a host device 10 and a printing device 20. Examples of the host device 10 include a personal computer (PC), a tablet PC, a mobile phone, for example, a smartphone or a feature phone, and a portable information terminal (personal digital assistant (PDA)). The host device 10 includes an output control device (print output control device) 100 that is communicably connected to the printing device (printer) 20 to control print processing in the printing device 20. For example, the output control device 100 is communicably connected to the printing device 20 by using one Bluetooth (trademark) communication path (port), to thereby control communication to and from the printing device 20. The printing device 20 is a printer configured to perform print processing under the control of the host device 10.

Figure 2:
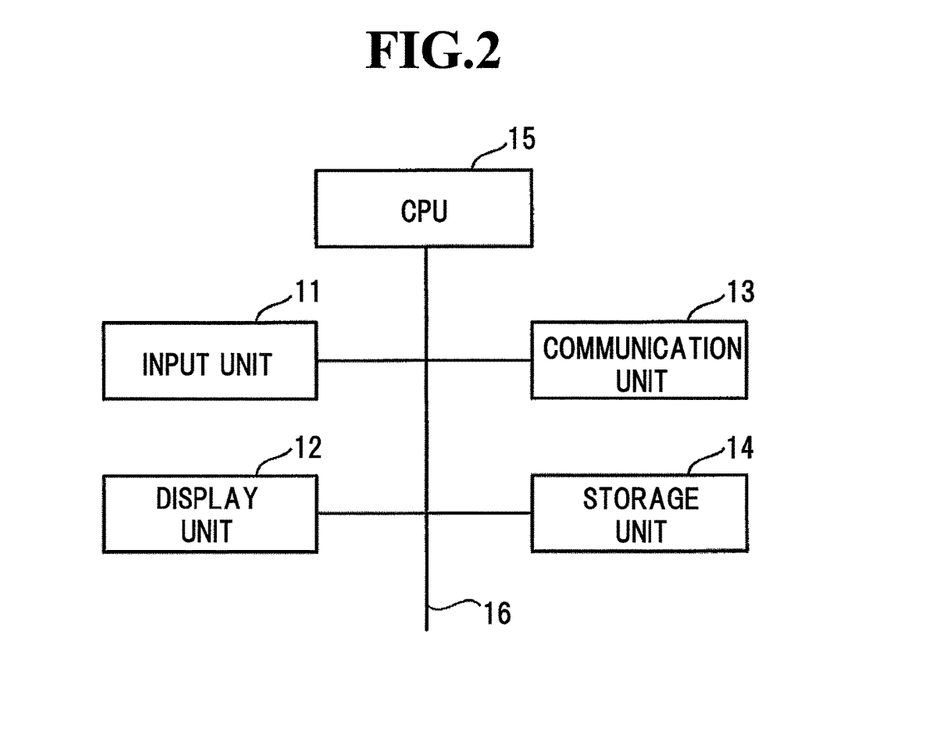
FIG. 2 is a diagram for illustrating an example of a hardware configuration of a host device according to the embodiment.

FIG. 2 is a schematic block diagram for illustrating an example of a hardware configuration of the host device 10. As illustrated in FIG. 2, the host device 10 includes an input unit 11, a display unit 12, a communication unit (communication circuit) 13, a storage unit 14, and a central processing unit (CPU) 15. Those units are connected to each other via a bus 16.

The input unit 11 is an input device configured to receive user operation input in accordance with an operation by the user. As the input unit 11, for example, a keyboard, buttons, a touch panel, a mouse, and a microphone, may be employed.

The display unit 12 includes, for example, a liquid crystal display (LCD) or an organic electroluminescence (EL) display. The display unit 12 is configured to display, for example, images, video, and characters.

The communication unit 13 includes a communication interface configured to communicate to and from an external device via a cable or wirelessly. For example, the communication unit 13 includes Bluetooth (trademark) as a communication interface, and is configured to communicate to and from the printing device 20 by using Bluetooth (trademark). As the communication interface, the communication unit 13 may also include, for example, a Universal Serial Bus (USB) and a Recommended Standard 232 version C (RS-232C), and be configured to use those communication interfaces to communicate to and from the printing device 20.

The storage unit 14 is constructed using a storage medium, for example, a random-access memory (RAM), a read-only memory (ROM), a flash ROM, or a hard disk drive (HDD), or is constructed using a combination of those storage media. The storage unit 14 is configured to store, for example, a program (for example, an OS for causing the CPU 15 to perform basic operations) for controlling each of the units included in the host device 10, an installed application program, and various types of information. The storage unit 14 is also configured to store a program (hereinafter also referred to as "software development kit (SDK)") for controlling communication processing to and from the printing device 20.

The CPU 15, which includes a central information processing device configured to function as a control center of the host device 10, is configured to control each of the units included in the host device 10. For example, the CPU 15 is configured to execute processing of basic operations based on the OS stored in the storage unit 14 and to execute processing based on the installed application program. The CPU 15 is also configured to perform processing for executing, via the OS, a function of various types of applications capable of operating on the OS. The CPU 15 is also configured to execute the functions of the output control device 100 based on the SDK for controlling communication processing to and from the printing device 20.

Figure 3:
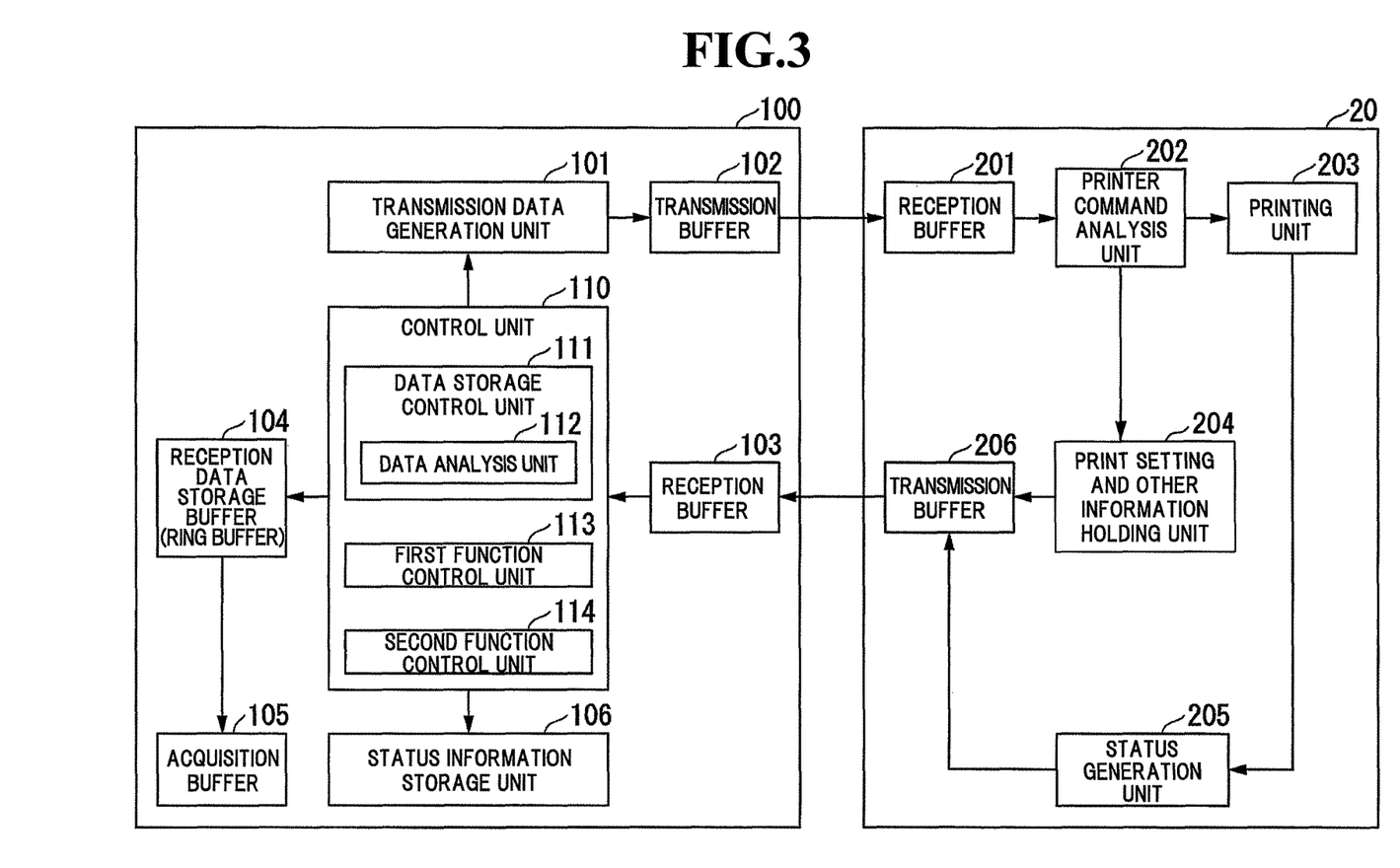
FIG. 3 is a block diagram for illustrating an example of a configuration of an output control device and a configuration of a printing device according to the embodiment.

FIG. 3 is a block diagram for illustrating an example of the configuration of the output control device 100 and the configuration of the printing device 20. First, a schematic configuration of the printing device 20 is described. The printing device 20 includes a reception buffer 201, a printer command analysis unit 202, a printing unit 203, a print setting and other information holding unit 204, a status generation unit 205, and a transmission buffer 206.

The reception buffer 201 is configured to store data and commands received from the output control device 100. The printer command analysis unit 202 is configured to analyze a command stored in the reception buffer 201. For example, when the command stored in the reception buffer 201 is a start printing command, the printer command analysis unit 202 outputs the start printing command to the printing unit 203. Further, when the command stored in the reception buffer 201 is an information acquisition request command for issuing an acquisition request of specific information on the printing device 20, the printer command analysis unit 202 outputs the information acquisition request command to the print setting and other information holding unit 204.

The printing unit 203 is configured to perform, when the start printing command is acquired, printing on a printing medium based on print data transmitted from the output control device 100 following the start printing command. The printing unit 203 is also configured to sequentially output an execution status of the print processing to the status generation unit 205. In general, the printing medium to be printed on by the printing unit 203 is paper, but the printing medium may be any material capable of being printed on.

The print setting and other information holding unit 204 is configured to hold information on a print setting and other information. When the information acquisition request command is acquired, the print setting and other information holding unit 204 stores, of the held information on a print setting and other information, the information requested in the information acquisition request command to the transmission buffer 206. The status generation unit 205 is configured to generate status information indicating a status of the printing device 20 based on the print processing execution status output from the printing unit 203 to periodically store the generated status information in the transmission buffer 206 at a timing set in advance. The status information is information indicating various statuses, for example, printing standby, now printing, printing finished, and an error. Data including information or the like stored in the transmission buffer 206 is sequentially transmitted to the output control device 100.

Next, the configuration of the output control device 100 is described. The output control device 100 includes a transmission data generation unit 101, a transmission buffer 102, a reception buffer 103, a reception data storage buffer 104, an acquisition buffer 105, a status information storage unit 106, and a control unit 110.

The transmission data generation unit 101 is configured to generate transmission data to be transmitted to the printing device 20. For example, the transmission data generation unit 101 is configured to generate transmission data, for example, the start printing command and the information acquisition request command, to store the generated transmission data in the transmission buffer 102. The transmission data stored in the transmission buffer 102 is sequentially transmitted to the printing device 20.

The reception buffer 103 is configured to sequentially store reception data (print data) received from the printing device 20. The reception data storage buffer 104 is for accumulating the reception data stored in the reception buffer 103. The reception data storage buffer 104 is a ring buffer. The acquisition buffer 105 is for transferring the reception data accumulated in the reception data storage buffer 104 so that the reception data can be utilized by the host device 10. The status information storage unit 106 is configured to store status information received from the printing device 20.

The control unit 110 is configured to execute a reception data acquisition function (first function) for acquiring reception data received from the printing device 20, an information acquisition function (second function) for acquiring specific information from the printing device 20, and a status information monitoring function (third function) for monitoring the status of the printing device 20.

The reception data acquisition function (first function) is a function for acquiring the reception data from the start of communication to and from the printing device 20 or from the previous acquisition of reception data until the current point. A size of the data to be acquired may be arbitrarily determined on the host device 10 side. In the reception data, there is included a response indicating execution of each type of processing of the printing device 20 and status information on the printing device 20. The response and status information may also be used for cause analysis when a failure has occurred. Therefore, the purpose of the reception data acquisition function (first function) is to acquire all of the reception data without any data gaps from the printing device 20.

The information acquisition function (second function) is a function for acquiring, triggered by transmission of the information acquisition request command from the host device 10 to the printing device 20, specific information set in the printing device 20. The information acquisition request command to be transmitted, the size of the data to be acquired, and a maximum waiting time during acquisition may be arbitrarily determined on the host device 10 side. The purpose of the information acquisition function (second function) is to acquire specific information from the printing device 20 (for example, setting information and held data information on the printing device 20) separately from the data to be routinely transmitted from the printing device 20 to the host device 10 (for example, response indicating processing execution and response information indicating status). When the specific information is not separately acquired, after a transmission request from the host device 10 to the printing device 20, the desired data needs to be extracted from the reception data acquired by the reception data acquisition function (first function), which means that the number of steps to be performed by the host device 10 is increased.

The status information monitoring function (third function) is a function for constantly monitoring the status of the printing device 20. The purpose of the status information monitoring function (third function) is to acquire the status information transmitted by the printing device 20 to the host device 10 in real time without a transmission request from the host device 10, and to notify the host device 10 of that status information.

The control unit 110 illustrated in FIG. 3 includes a data storage control unit 111, a data analysis unit 112, a first function control unit 113, and a second function control unit 114. The data storage control unit 111 is configured to execute processing for storing and accumulating reception data in the reception data storage buffer 104, and for storing status information in the status information storage unit 106. Specifically, the data storage control unit 111 is configured to determine whether or not reception data is stored in the reception buffer 103 by periodically checking by polling the reception buffer 103 in a fixed cycle. When it is determined that reception data is stored in the reception buffer 103, the data storage control unit 111 stores and accumulates the stored reception data in the reception data storage buffer 104.

When status information is included in the reception data to be accumulated in the reception data storage buffer 104 from the reception buffer 103, the data storage control unit 111 stores the status information in the status information storage unit 106. For example, the data storage control unit 111 includes the data analysis unit 112, which is configured to analyze whether or not status information is included in the reception data to be accumulated in the reception data storage buffer 104 from the reception buffer 103. When it is determined based on an analysis result by the data analysis unit 112 that status information is included in the reception data, the data storage control unit 111 stores the status information in the status information storage unit 106. The host device 10 is capable of constantly monitoring the status of the printing device 20 (i.e., performing the status information monitoring function (third function)) by utilizing the status information stored in the status information storage unit 106. The data analysis unit 112 is capable of analyzing an information type of each piece of reception data based on an identifier added to each piece of reception data. For example, header information and footer information including identifiers indicating the information type are added to each piece of reception data.

The first function control unit 113 is configured to execute processing relating to the reception data acquisition function (first function). Specifically, when the reception data acquisition function (first function) is executed, the first function control unit 113 stores, in the acquisition buffer 105, the reception data accumulated in the reception data storage buffer 104 to send back the stored reception data as an acquisition value for the reception data acquisition function (first function).

The second function control unit 114 is configured to execute processing relating to the information acquisition function (second function). Specifically, when the information acquisition function (second function) is executed, the second function control unit 114 stores, in the acquisition buffer 105, the reception data accumulated in the reception data storage buffer 104 from when the information acquisition function (second function) is executed to send back the stored reception data as an acquisition value for the information acquisition function (second function). For example, the second function control unit 114 is configured to store, up to a designated maximum number of pieces of data, in the acquisition buffer 105, the reception data accumulated in the reception data storage buffer 104 from when the information acquisition function (second function) is executed to send back the stored reception data as the acquisition value for the information acquisition function (second function).

Figure 4:
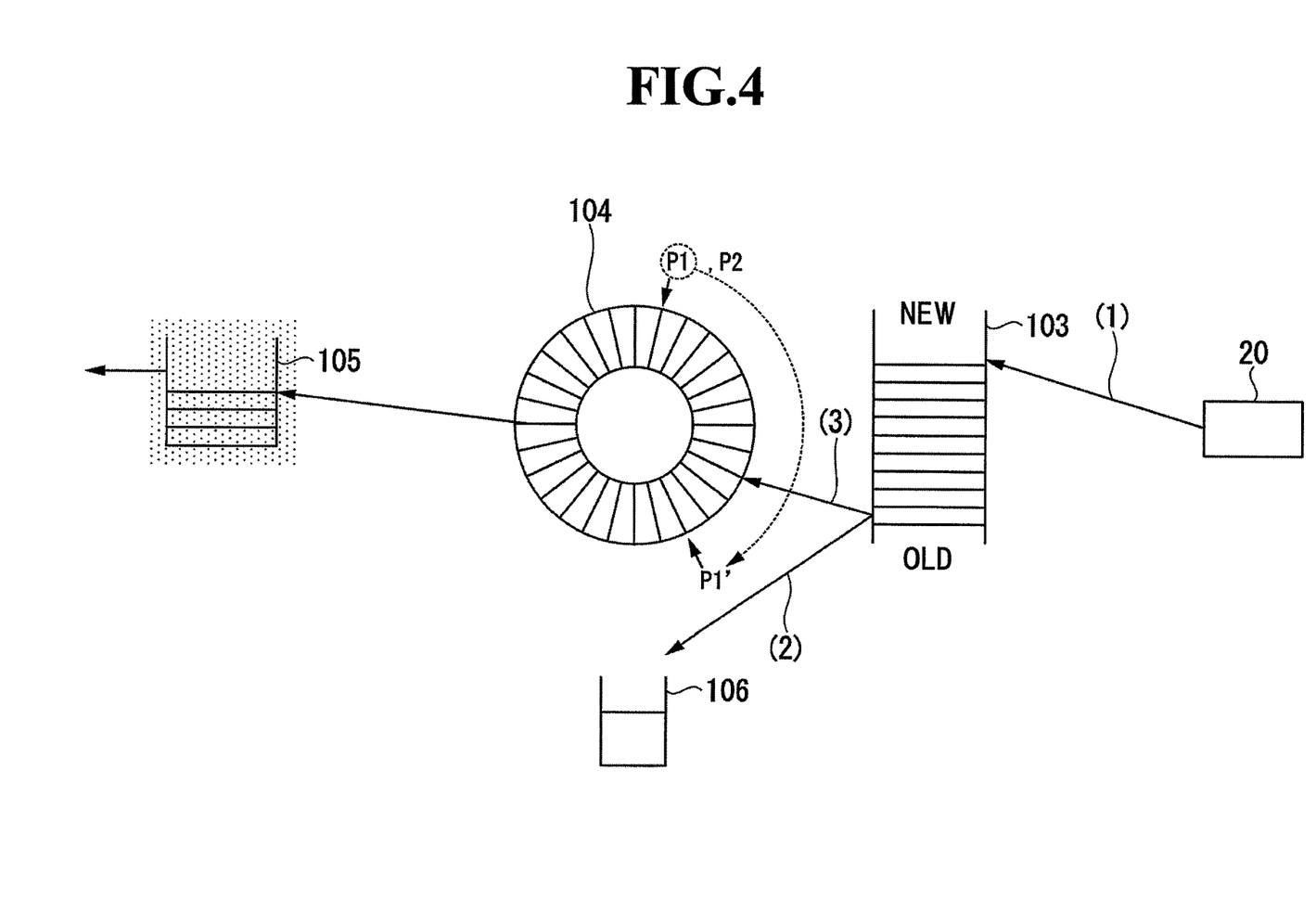
FIG. 4 is an explanatory diagram for schematically illustrating an outline of data storage processing according to the embodiment.
Figure 5:
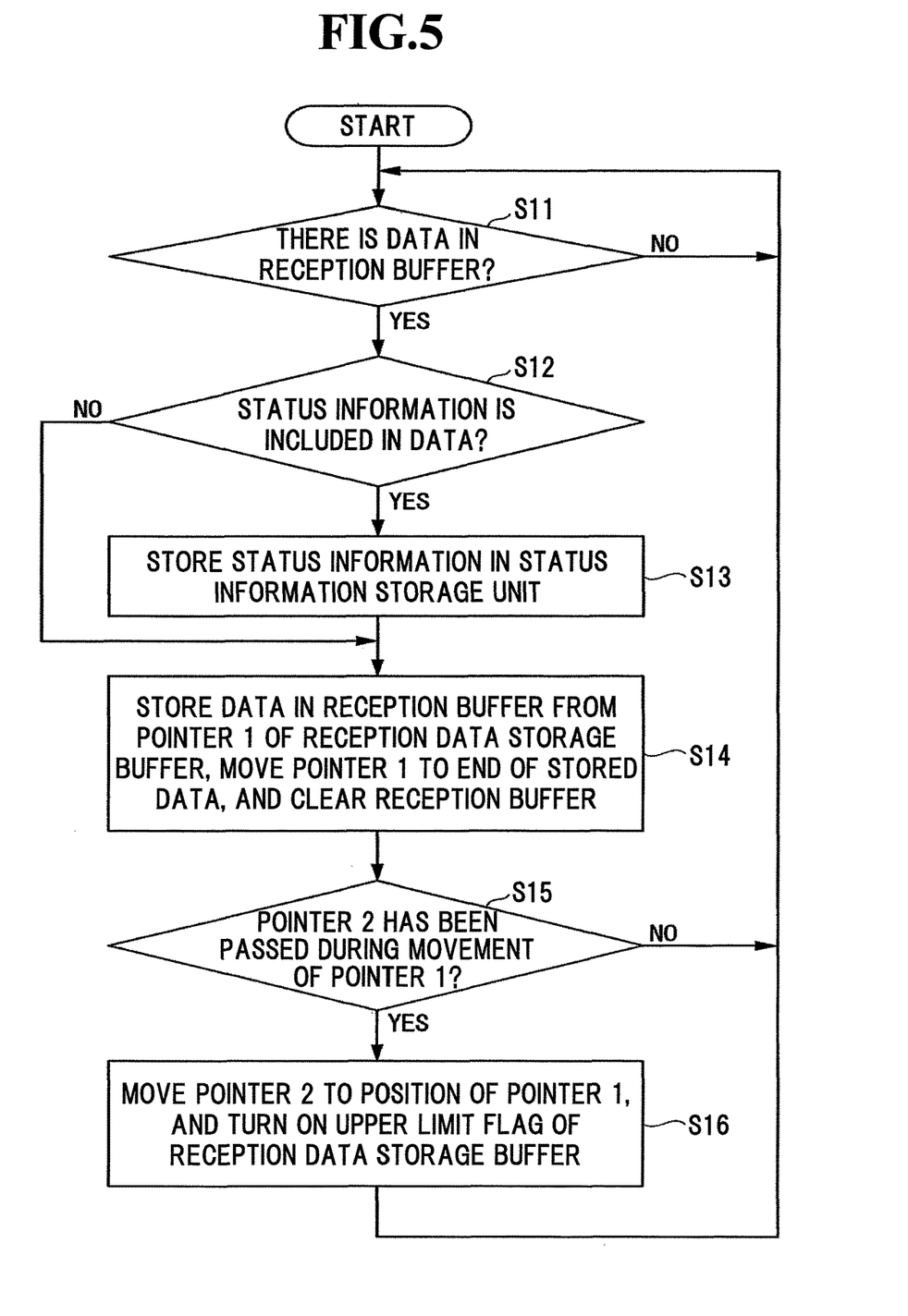
FIG. 5 is a flowchart for illustrating an example of the data storage processing according to the embodiment.

Next, a communication control processing operation executed by the control unit 110 is described. First, data storage processing for storing the reception data and the status information is described with reference to FIG. 4 and FIG. 5. FIG. 4 is an explanatory diagram for schematically illustrating an outline of the data storage processing according to this embodiment. FIG. 5 is a flowchart for illustrating an example of the data storage processing according to this embodiment.

(Step S11) The reception data received from the printing device 20 from communication start to finish by the output control device 100 is sequentially stored in the reception buffer 103 (indicated by reference numeral (1) of FIG. 4). The control unit 110 polls the reception buffer 103 in a fixed cycle from communication start to finish, and determines whether or not the reception data is stored in the reception buffer 103. When it is determined that reception data is not stored in the reception buffer 103 (NO), the control unit 110 repeats Step S11. On the other hand, when it is determined that reception data is stored in the reception buffer 103 (YES), the control unit 110 advances the processing to Step S12.

(Step S12) The control unit 110 analyzes and determines whether or not status information is included in the reception data stored in the reception buffer 103. When it is determined that status information is included in the reception data (YES), the control unit 110 advances the processing to Step S13. On the other hand, when it is determined that status information is not included in the reception data (NO), the control unit 110 advances the processing to Step S14.

(Step S13) The control unit 110 stores the status information included in the reception data in the status information storage unit 106 (indicated by reference numeral (2) of FIG. 4). Then, the control unit 110 advances the processing to Step S14.

(Step S14) The control unit 110 stores the reception data stored in the reception buffer 103 in the reception data storage buffer 104 (indicated by reference numeral (3) of FIG. 4). For example, the control unit 110 replicates and stores, of the reception data stored in the reception buffer 103, the reception data for which the analysis executed in Step S12 has finished, and advances a "pointer 1" by the stored data size. The "pointer 1" indicates a start position when the reception data is stored. The control unit 110 stores the reception data in the reception buffer 103 from the position of the "pointer 1", and then moves the "pointer 1" to an end of the stored reception data. The control unit 110 then clears the reception buffer 103 such that the reception buffer 103 is in an empty state.

In the example illustrated in FIG. 4, P1 indicates the position of the "pointer 1" and P2 indicates the position of a "pointer 2" in the reception data storage buffer 104. The "pointer 2" indicates the start position in the reception data storage buffer 104 when the reception data is acquired by the reception data acquisition function (first function). First, when the position of P1 of the "pointer 1" and the position of P2 of the "pointer 2" are at the same position (for example, a position at the end of the reception data that was stored the previous time and that has finished being acquired by the reception data acquisition function (first function)), and the reception data is stored from the reception buffer 103, the "pointer 1" is moved from P1 to P1' by the stored data size. Specifically, the position of P1' is the position at the end of the reception data stored this time. As a result, the control unit 110 accumulates, in the reception data storage buffer 104, the reception data stored in the reception buffer 103 by sequentially storing the reception data from the position of the "pointer 1" while moving the "pointer 1".

(Step S15) The control unit 110 determines whether or not the "pointer 1" has passed the "pointer 2" during the movement of the "pointer 1" in Step S14. When it is determined that the "pointer 1" has not passed the "pointer 2" (NO), the control unit 110 returns the processing to Step S11, and determines whether or not reception data is stored in the reception buffer 103. On the other hand, when it is determined that the "pointer 1" has passed the "pointer 2" (YES), the control unit 110 advances the processing to Step S16.

(Step S16) When it is determined that the "pointer 1" has passed the "pointer 2", the control unit 110 moves the "pointer 2" to the position of the "pointer 1". Specifically, the control unit 110 also moves the "pointer 2" to match with the "pointer 1". Further, the control unit 110 manages a flag (upper limit flag) indicating that an upper limit of the reception data storage buffer 104 has been reached. For example, when the "pointer 1" has passed the "pointer 2", the control unit 110 turns on the upper limit flag of the reception data storage buffer 104. The control unit 110 then returns the processing to Step S11.

Figure 6:
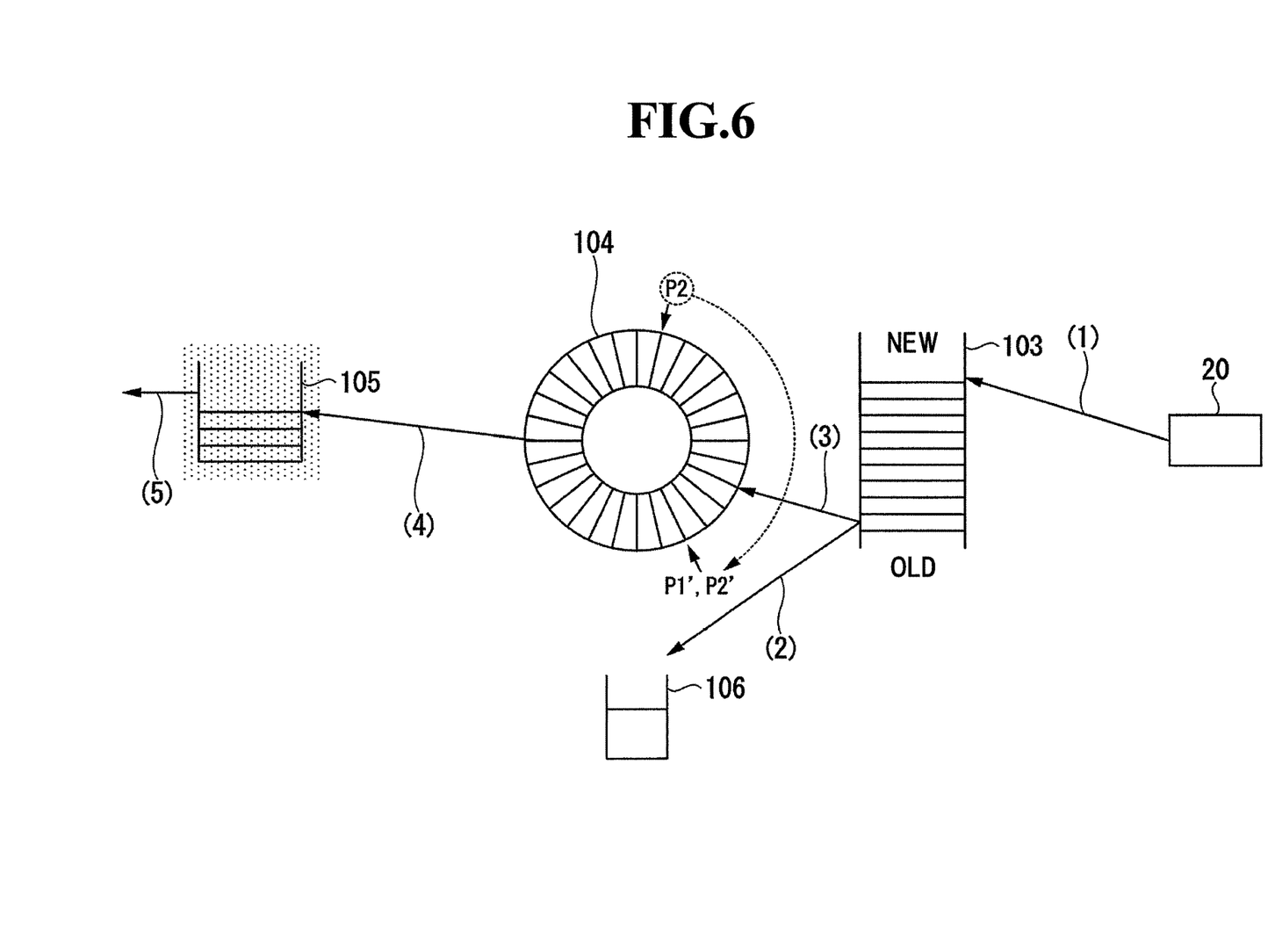
FIG. 6 is an explanatory diagram for schematically illustrating an outline of reception data acquisition processing according to the embodiment.
Figure 7:
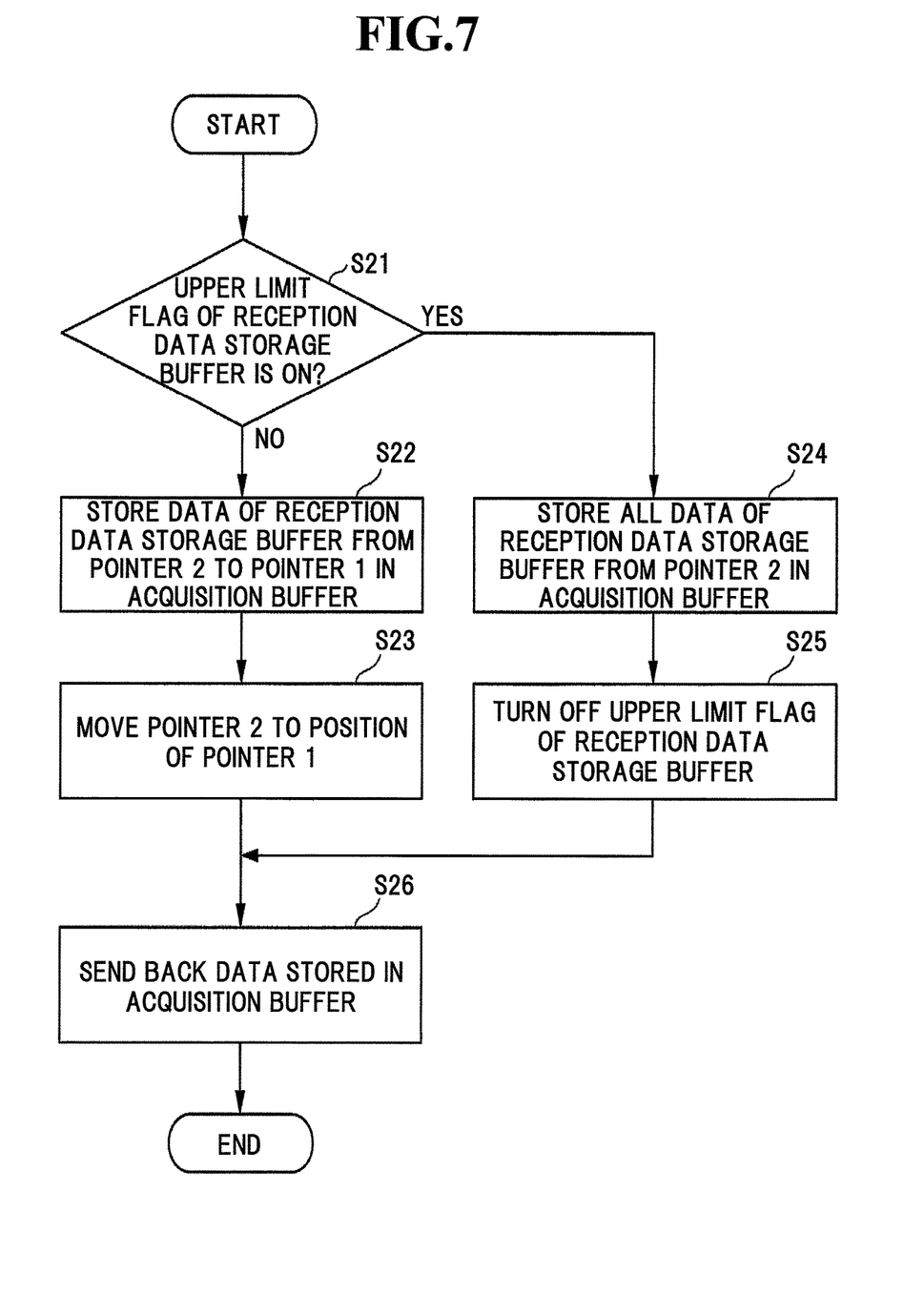
FIG. 7 is a flowchart for illustrating an example of the reception data acquisition processing according to the embodiment.

Next, reception data acquisition processing by the reception data acquisition function (first function) is described with reference to FIG. 6 and FIG. 7. FIG. 6 is an explanatory diagram for schematically illustrating an outline of the reception data acquisition processing according to this embodiment. FIG. 7 is a flowchart for illustrating an example of the reception data acquisition processing according to this embodiment.

(Step S21) When the reception data acquisition function (first function) is executed by the host device 10, the control unit 110 determines whether or not the upper limit flag of the reception data storage buffer 104 is ON. When it is determined that the upper limit flag is OFF (NO), the control unit 110 advances the processing to Step S22. On the other hand, when it is determined that the upper limit flag is ON (YES), the control unit 110 advances the processing to Step S24.

(Step S22) When the upper limit flag is OFF, the control unit 110 stores, in the acquisition buffer 105, the reception data stored in the reception data storage buffer 104 from the "pointer 2" to the "pointer 1" (indicated by reference numeral (4) of FIG. 6). In the example illustrated in FIG. 6, in the reception data storage buffer 104, P1' indicates the position of the "pointer 1", and P2 indicates the position of the "pointer 2". First, the control unit 110 stores the reception data from the position of P2 of the "pointer 2" to the position of P1' of the "pointer 1" in the acquisition buffer 105. Then, the control unit 110 advances the processing to Step S23.

(Step S23) The control unit 110 moves the "pointer 2" from the position of P2 to the position of P2'. Specifically, the control unit 110 moves the "pointer 2" to the position of the "pointer 1". As a result, similar to the schematic diagram of the data storage processing illustrated in FIG. 4, the position of the "pointer 1" and the position of the "pointer 2" become the same, and the storage position of the reception data to be stored next from the reception buffer 103 and the start position when the reception data is acquired are determined. Then, the control unit 110 advances the processing to Step S26.

(Step S24) When the upper limit flag is ON, the control unit 110 stores, in the acquisition buffer 105, all of the reception data stored in the reception data storage buffer 104 from the "pointer 2" (indicated by reference numeral (4) of FIG. 6). Then, the control unit 110 advances the processing to Step S25.

(Step S25) The control unit 110 turns the upper limit flag of the reception data storage buffer 104 from ON to OFF, and then advances the processing to Step S26. The acquisition buffer 105 is generated by, for example, execution of a mathematical function so as to ensure a size capable of storing a designated data size during execution of the reception data acquisition function (first function).

(Step S26) The control unit 110 sends back, to the host device 10, the reception data stored in the acquisition buffer 105 as the acquisition value for the reception data acquisition function (first function) (indicated by reference numeral (5) of FIG. 6), and then ends the reception data acquisition processing.

Figure 8:
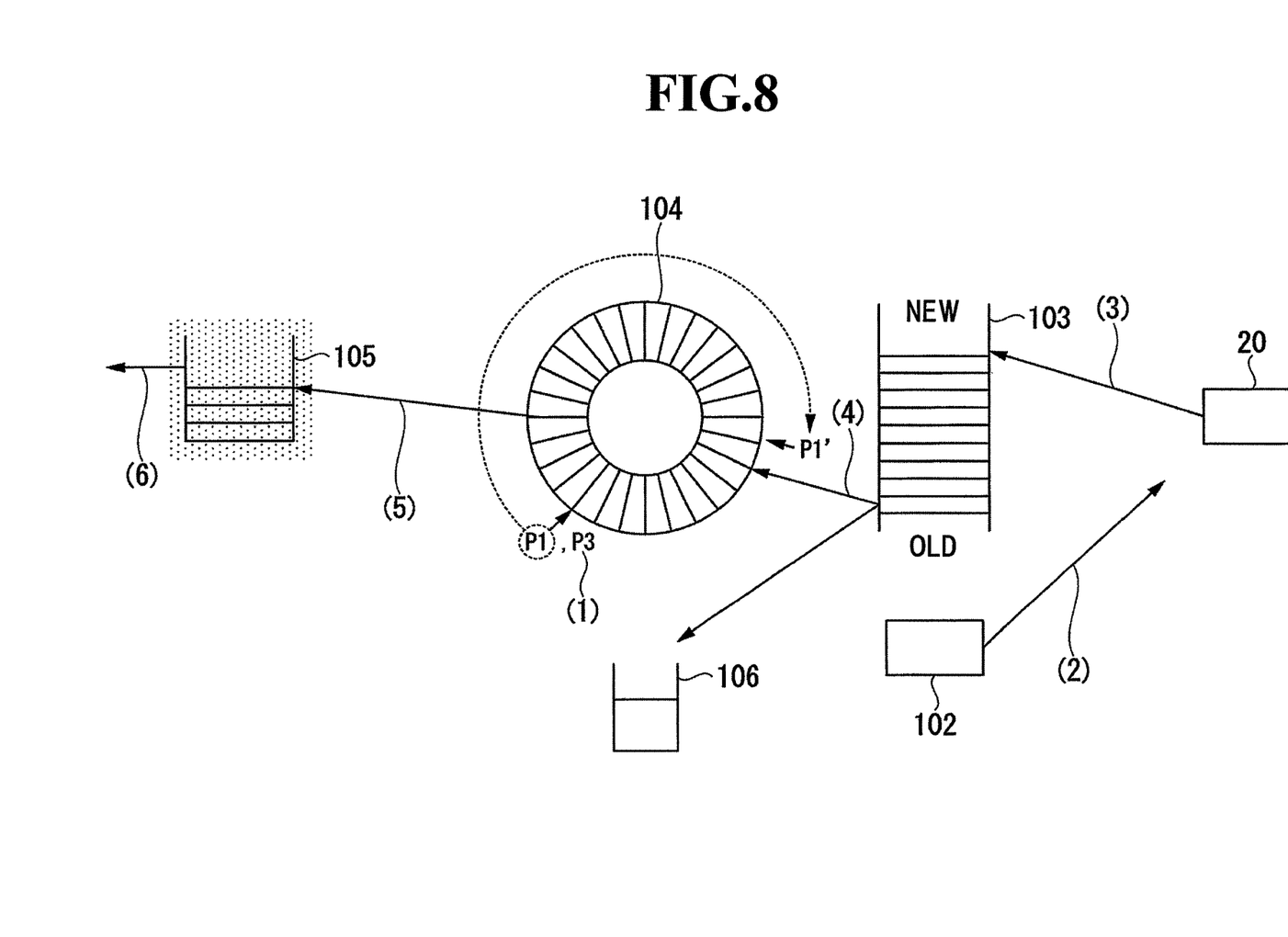
FIG. 8 is an explanatory diagram for schematically illustrating an outline of information acquisition processing according to the embodiment.
Figure 9:
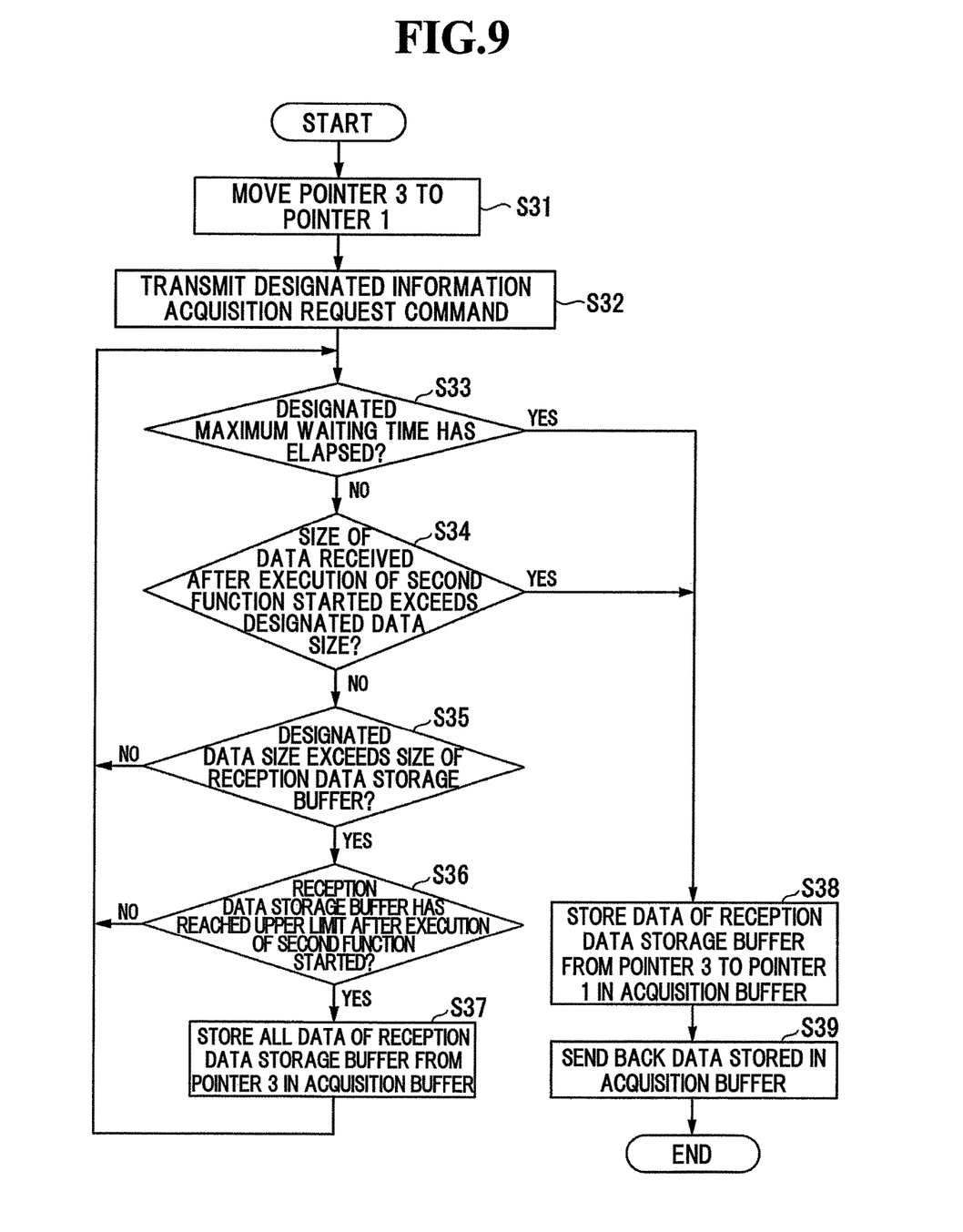
FIG. 9 is a flowchart for illustrating an example of the information acquisition processing according to the embodiment.

Next, information acquisition processing by the information acquisition function (second function) is described with reference to FIG. 8 and FIG. 9. FIG. 8 is an explanatory diagram for schematically illustrating an outline of the information acquisition processing according to this embodiment. FIG. 9 is a flowchart for illustrating an example of the information acquisition processing according to this embodiment.

(Step S31) When the information acquisition function (second function) is executed, the control unit 110 moves a "pointer 3" to the position at which the "pointer 1" is located when the information acquisition function (second function) is executed (indicated by reference numeral (1) of FIG. 8). The "pointer 3" indicates the start position in the reception data storage buffer 104 when the specific information is acquired by the information acquisition function (second function). In the example illustrated in FIG. 8, P1 indicates the position of the "pointer 1" and P3 indicates the position of the "pointer 3". Then, the control unit 110 advances the processing to Step S32.

(Step S32) The control unit 110 causes the transmission data generation unit 101 to generate the information acquisition request command designated by the executed information acquisition function (second function), and transmits the generated information acquisition request command to the printing device 20 via the transmission buffer 102 (indicated by reference numeral (2) of FIG. 8). As a result, the specific information specified by the information acquisition request command is stored in the reception buffer 103 from the printing device 20 (indicated by reference numeral (3) of FIG. 8), and is accumulated in the reception data storage buffer 104 by the data storage processing described with reference to FIG. 4 and FIG. 5 (indicated by reference numeral (4) of FIG. 8). The control unit 110 replicates the reception data from the reception buffer 103, stores from the position of the "pointer 1" of the reception data storage buffer 104, and advances the "pointer 1" by the stored data size. In the example illustrated in FIG. 8, the "pointer 1", which is located at the same position as the position of P3 of the "pointer 3", is moved from P1 to P1' by the stored data size. Then, the control unit 110 advances the processing to Step S33.

(Step S33) The control unit 110 determines whether or not a designated maximum waiting time has elapsed from when the information acquisition function (second function) was executed. When it is determined that the designated maximum waiting time has not elapsed (NO), the control unit 110 advances the processing to Step S34. On the other hand, when it is determined that the designated maximum waiting time has elapsed (YES), the control unit 110 advances the processing to Step S38.

(Step S34) The control unit 110 determines whether or not the size of the reception data received after execution of the information acquisition function (second function) started exceeds a designated data size. When it is determined that the size of the reception data exceeds the designated data size (YES), the control unit 110 advances the processing to Step S38. On the other hand, when it is determined that the size of the reception data does not exceed the designated data size (NO), the control unit 110 advances the processing to Step S35.

(Step S35) When it is determined that the designated maximum waiting time has not elapsed, and when the size of the reception data does not exceed the designated data size, the control unit 110 determines whether or not the designated data size exceeds the size of the reception data storage buffer 104. When it is determined that the designated data size does not exceed the size of the reception data storage buffer 104 (NO), the control unit 110 returns the processing to Step S33. On the other hand, when it is determined that the designated data size exceeds the size of the reception data storage buffer 104 (YES), the control unit 110 advances the processing to Step S36.

(Step S36) The control unit 110 determines whether or not the reception data storage buffer 104 has reached an upper limit after execution of the information acquisition function (second function) started. When it is determined that the reception data storage buffer 104 has not reached the upper limit (NO), the control unit 110 returns the processing to Step S33. On the other hand, when it is determined that the reception data storage buffer 104 has reached the upper limit (YES), the control unit 110 advances the processing to Step S37.

(Step S37) The control unit 110 stores, in the acquisition buffer 105, all of the reception data stored in the reception data storage buffer 104 from the "pointer 3" (indicated by reference numeral (5) of FIG. 8). Then, the control unit 110 returns the processing to Step S33.

In other words, during execution of the information acquisition function (second function), in a case in which a size exceeding the size of the reception data storage buffer 104 is designated as the data size of the specific information requested by the information acquisition request command, when the "pointer 1" has caught up to the "pointer 3", this means that the size of the reception data storage buffer 104 is at its upper limit. As a result, when the "pointer 1" has caught up to the "pointer 3", the control unit 110 stores all of the reception data stored in the reception data storage buffer 104 in the acquisition buffer 105. Thereafter, until the designated data size is reached, the control unit 110 repeats the processing for storing all of the reception data stored in the reception data storage buffer 104 in the acquisition buffer 105 each time the "pointer 1" catches up to the "pointer 3".

(Step S38) When the designated maximum waiting time has elapsed from when the information acquisition function (second function) was executed (Step S33: YES), or when the size of the reception data exceeds the designated data size (Step S34: YES), the control unit 110 stores, in the acquisition buffer 105, the reception data of the reception data storage buffer 104 from the "pointer 3" to the "pointer 1" (indicated by reference numeral (5) of FIG. 8). Then, the control unit 110 advances the processing to Step S39. The acquisition buffer 105 is generated by, for example, execution of a mathematical function so as to ensure a size capable of storing the designated data size during execution of the information acquisition function (second function). The designated data size may be equal to or larger than the size of the reception data storage buffer 104, and hence the acquisition buffer 105 can also handle data having a size equal to or larger than the size of the reception data storage buffer 104.

(Step S39) The control unit 110 sends back, to the host device 10, the reception data stored in the acquisition buffer 105 (i.e., the specific information designated by the information acquisition request command) as the acquisition value for the information acquisition function (second function) (indicated by reference numeral (6) of FIG. 8), and then ends the information acquisition processing.

As described above, the output control device 100 according to this embodiment includes the communication unit 13, the data storage control unit 111, the first function control unit 113, and the second function control unit 114. The communication unit 13 is configured to communicate to and from the printing device 20, which is an example of an output device, by using one communication path. The data storage control unit 111 is configured to periodically check the reception buffer 103 (first buffer unit) configured to sequentially store reception data (print data) received from the printing device 20 via the communication unit 13, and to accumulate, when the reception data is stored in the reception buffer 103, the stored reception data in the reception data storage buffer 104 (second buffer unit). Further, the data storage control unit 111 is configured to store, when status information (second data) is included in the reception data, the status information in the status information storage unit 106, which is an example of a data storage unit. Further, the first function control unit 113 is configured to store, when the reception data acquisition function (first function) is executed, in the acquisition buffer 105 (third buffer unit), the reception data accumulated in the reception data storage buffer 104 to send back the stored reception data as the acquisition value for the reception data acquisition function (first function). Meanwhile, the second function control unit 114 is configured to store, when the information acquisition function (second function) is executed, in the acquisition buffer 105, the reception data accumulated in the reception data storage buffer 104 from when the information acquisition function (second function) is executed to send back the stored reception data as the acquisition value for the information acquisition function (second function).

The configuration described above allows the output control device 100 to implement communication functions to and from the printing device 20 by one communication path. For example, even when connected to and communicating to and from the printing device 20 by one communication path, the output control device 100 can implement three functions, namely, the reception data acquisition function (first function) for acquiring reception data to be received from the printing device 20, the information acquisition function (second function) for acquiring specific information from the printing device 20, and the status information monitoring function (third function) for monitoring the status of the printing device 20. For example, the output control device 100 is capable of acquiring all of the reception data without any data gaps from the printing device 20, and separately acquiring the status information from among the reception data. The output control device 100 is also capable of acquiring the specific information from the printing device 20 (for example, setting information and held data information on the printing device 20) separately from the data to be routinely transmitted from the printing device 20 to the host device 10 (for example, response indicating processing execution and response information indicating status).

The data storage control unit 111 includes the data analysis unit 112, which is configured to analyze whether or not the status information is included in the reception data to be accumulated in the reception data storage buffer 104 from the reception buffer 103. Further, the data storage control unit 111 is configured to store the status information in the status information storage unit 106 when it is determined based on an analysis result by the data analysis unit 112 that the status information is included in the reception data.

As a result, when the output control device 100 is connected to and communicating to and from the printing device 20 by one communication path, the output control device 100 can acquire status information transmitted by the printing device 20 to the host device 10 in real time without a transmission request from the host device 10, and notify the host device 10 of that status information.

The second function control unit 114 is configured to store, up to a designated maximum number of pieces of data, in the acquisition buffer 105, the reception data accumulated in the reception data storage buffer 104 from when the information acquisition function (second function) is executed to send back the stored reception data as the acquisition value for the information acquisition function (second function). As a result, the output control device 100 can acquire from the printing device 20 data equal to the designated data size without any data gaps or missing data.

All or a portion of the function of each unit included in the output control device 100 according to the embodiment may also be implemented by recording a program for implementing those functions in a computer-readable recording medium, and reading and executing the program recorded in the recording medium on a computer system. As used herein, the computer system may include an OS and hardware, for example, a peripheral device.

The term "computer-readable recording medium" refers to portable media, such as a flexible disk, a magneto-optical disc, a ROM, and a CD-ROM, or a storage unit included in the computer system, for example, a hard disk. The term "computer-readable recording medium" may also refer to a medium configured to dynamically hold a program for a short period of time, like a communication cable when transmitting a program via a network, for example, the Internet, or a communication line, for example, a telephone line, or to a medium configured to hold a program for a fixed period of time, like a volatile memory in a computer system serving as a server or a client in such a case. The above-mentioned program may be a program for implementing a portion of the above-mentioned functions, or may be capable of implementing the above-mentioned functions in combination with a program already recorded in the computer system.

An embodiment of the present invention is described above, but the present invention is not limited to that embodiment, and the present invention can be implemented in various modes that fall within the gist thereof.

In the above-mentioned embodiment, the printing device 20 is described as an example of an output device connected to and communicating to and from the output control device 100 (host device 10). However, the present invention is not limited to this. For example, the output control device 100 is not limited to being connected to the printing device 20. The output control device 100 may be connected to and communicate to and from another output device, and the communication control processing according to this embodiment may be applied. The another output device may be, for example, a speaker or a display device.

What is claimed is:

1. A print output control device operably connected to a printer, comprising:
   a communication circuit configured to communicate to and from the printer by using one communication path;
   a first buffer configured to sequentially store print data received from the printer;
   a second buffer configured to accumulate the print data stored in the first buffer;
   a status storage unit configured to store status information on the printer included in the print data;
   a data storage controller comprising a data analyzer configured to analyze whether or not the status information is included in the print data to be accumulated in the second buffer from the first buffer, the data storage controller being configured to:
   periodically check the presence of the the print data in the first buffer;
   accumulate the stored print data in the second buffer when the print data is stored in the first buffer; and
   store the status information in the status storage unit when it is determined based on an analysis result by the data analyzer that the status information is included in the print data;
   a first function controller configured to store, when a first function for acquiring the print data received from the printer is executed, in the third buffer, the print data accumulated in the second buffer to send back the stored print data as an acquisition value for the first function; and
   a second function controller configured to store, when a second function for acquiring specific information from the printer is executed, in a third buffer, the print data accumulated in the second buffer from when the second function is executed to send back the stored print data as an acquisition value for the second function.

2. A print output control device according to claim 1, wherein the second function controller is configured to store, up to a designated maximum number of pieces of data, in the third buffer, the print data accumulated in the second buffer from when the second function is executed to send back the stored print data as the acquisition value for the second function.

3. A print output control device according to claim 2, wherein the first function comprises a function for acquiring the print data from one of a start of communication to and from the printer and previous acquisition of the print data until the first function is executed.

4. A print output control device according to claim 3, wherein the second function comprises a function for acquiring information set in the printer.

5. A print output control device according to claim 4, wherein the second buffer comprises a ring buffer.

6. A print output control device according to claim 1, wherein the second function controller is configured to store, up to a designated maximum number of pieces of data, in the third buffer, the print data accumulated in the second buffer from when the second function is executed to send back the stored print data as the acquisition value for the second function.

7. A print output control device according to claim 1, wherein the first function comprises a function for acquiring the print data from one of a start of communication to and from the printer and previous acquisition of the print data until the first function is executed.

8. A print output control device according to claim 1, wherein the second function comprises a function for acquiring information set in the printer.

9. A print output control device according to claim 1, wherein the second buffer comprises a ring buffer.

10. A control method to be executed in a print output control device operably connected to a printer, the output control device comprising a communication circuit configured to communicate to and from the printer by using one communication path, the control method comprising:
    periodically checking a first buffer configured to sequentially store print data received from the printer via the communication circuit, and accumulating, when the print data is stored in the first buffer, the stored print data in a second buffer;
    analyzing whether or not status information is included in the print data accumulated in the second buffer from the first buffer;
    storing the status information in a status storage unit when it is determined based on an analysis result that the status information is included in the print data;
    storing, when a first function for acquiring the print data received from the printer is executed, in a third buffer, the print data accumulated in the second buffer, and sending back the stored print data as an acquisition value for the first function; and
    storing, when a second function for acquiring specific information from the printer is executed, in the third buffer, the print data accumulated in the second buffer from when the second function is executed, and sending back the stored print data as an acquisition value for the second function.

* * * * *